United States Patent
Khambete

(10) Patent No.: US 7,540,307 B1
(45) Date of Patent: Jun. 2, 2009

(54) MACHINE HAVING VARIABLE FIBER FILLING SYSTEM FOR FORMING FIBER PARTS

(75) Inventor: Surendra Khambete, West Bloomfield, MI (US)

(73) Assignee: IndraTech LLC, Auburn Hills, MI (US)

( * ) Notice: Subject to any disclaimer, the term of this patent is extended or adjusted under 35 U.S.C. 154(b) by 412 days.

(21) Appl. No.: 11/244,785

(22) Filed: Oct. 6, 2005

Related U.S. Application Data

(60) Provisional application No. 60/522,491, filed on Oct. 6, 2004.

(51) Int. Cl.
*B65B 31/02* (2006.01)
*B65B 1/04* (2006.01)
*B65B 3/04* (2006.01)
*B29C 39/24* (2006.01)

(52) U.S. Cl. .............................. 141/5; 141/11; 141/67; 264/40.5; 425/145

(58) Field of Classification Search .................... 141/5, 141/11, 65, 67, 82, 95; 264/40.4, 40.5, 40.7; 425/145–150
See application file for complete search history.

(56) References Cited

U.S. PATENT DOCUMENTS

| | | | |
|---|---|---|---|
| 3,216,464 A | * | 11/1965 | Horst .......................... 425/130 |
| 3,726,954 A | * | 4/1973 | Munk et al. .................... 141/67 |
| 4,207,636 A | | 6/1980 | Ceriani |
| 4,298,418 A | | 11/1981 | Takagi |
| 4,386,041 A | | 5/1983 | Takagi |
| 4,563,387 A | | 1/1986 | Takagi et al. |
| 4,618,531 A | | 10/1986 | Marcus |
| 4,668,562 A | | 5/1987 | Street |
| 4,678,015 A | * | 7/1987 | Raque et al. ................. 141/131 |
| 4,753,693 A | | 6/1988 | Street |
| 4,867,665 A | * | 9/1989 | Wada .......................... 425/145 |
| 4,940,502 A | | 7/1990 | Marcus |
| 4,982,466 A | | 1/1991 | Higgins et al. |
| 5,079,074 A | | 1/1992 | Steagall et al. |

(Continued)

FOREIGN PATENT DOCUMENTS

EP 0606184 1/1994

(Continued)

OTHER PUBLICATIONS

Sketch of "IFP Process by Hermann".

(Continued)

*Primary Examiner*—Timothy L Maust
*Assistant Examiner*—Nicolas A Arnett
(74) *Attorney, Agent, or Firm*—Carlson, Gaskey & Olds

(57) ABSTRACT

An inventive machine and method are used for manufacturing fiber articles with a variable density across the article. The machine includes a mold providing a cavity. An inventive cover providing an opening is arranged over the cavity. In one example, the opening is provided on a belt. The size of the opening may also be adjustable. The cover and mold move relative to one another to arrange the opening over multiple portions of the cavity. A fiber feed system deposits fiber material in the multiple portions beneath the opening in varying amounts. Various sensors and other devices may be used to control the positioning of the opening to regulate the distribution of fiber deposited in the cavity.

15 Claims, 2 Drawing Sheets

U.S. PATENT DOCUMENTS

| | | | |
|---|---|---|---|
| 5,152,018 A | 10/1992 | Lea | |
| 5,169,580 A | 12/1992 | Marcus | |
| 5,183,708 A | 2/1993 | Yoshida et al. | |
| 5,194,311 A | 3/1993 | Baymak et al. | |
| 5,231,717 A | 8/1993 | Scott et al. | |
| 5,272,000 A | 12/1993 | Chenoweth et al. | |
| 5,294,392 A | 3/1994 | Marcus | |
| 5,363,804 A | 11/1994 | McAlister | |
| 5,492,662 A | 2/1996 | Kargol et al. | |
| 5,494,627 A | 2/1996 | Kargol et al. | |
| 5,515,811 A | 5/1996 | McAlister | |
| 5,552,205 A | 9/1996 | Lea | |
| 5,591,289 A | 1/1997 | Souders et al. | |
| 5,641,009 A * | 6/1997 | Marks et al. | 141/67 |
| 5,642,601 A | 7/1997 | Thompson, Jr. et al. | |
| 5,660,908 A | 8/1997 | Kelman et al. | |
| 5,679,197 A | 10/1997 | Haupt et al. | |
| 5,679,296 A | 10/1997 | Kelman et al. | |
| 5,688,467 A | 11/1997 | Kelman et al. | |
| 5,733,631 A | 3/1998 | Kelman | |
| 6,033,501 A | 3/2000 | Yamaguchi et al. | |
| 6,033,607 A | 3/2000 | Kataoka et al. | |
| 6,077,378 A | 6/2000 | Bullard et al. | |
| 6,096,249 A | 8/2000 | Yamaguchi | |
| 6,155,647 A | 12/2000 | Albecker, III | |
| 6,210,147 B1 | 4/2001 | Mori et al. | |
| 6,402,500 B1 * | 6/2002 | Zahrah et al. | 141/67 |
| 6,409,269 B1 | 6/2002 | Aebischer et al. | |
| 6,500,292 B1 | 12/2002 | Mossbeck et al. | |
| 6,588,462 B1 * | 7/2003 | Ogawa et al. | 141/67 |
| 6,596,387 B2 | 7/2003 | Ogle | |
| 6,694,554 B2 | 2/2004 | Bullard | |
| 6,740,610 B2 | 5/2004 | Mossbeck et al. | |
| 7,008,691 B2 | 3/2006 | Ogle | |
| 7,125,460 B2 | 10/2006 | Ogle et al. | |
| 7,132,022 B2 | 11/2006 | Ogle et al. | |
| 7,166,547 B2 | 1/2007 | Tilton et al. | |
| 7,216,936 B2 | 5/2007 | Peterson | |
| 2001/0047558 A1 | 12/2001 | Collard et al. | |
| 2003/0022580 A1 | 1/2003 | Bogrett et al. | |
| 2003/0168761 A1 * | 9/2003 | Hirose et al. | 264/40.4 |
| 2005/0020171 A1 | 1/2005 | Yoshida et al. | |
| 2005/0023080 A1 | 2/2005 | Tompson et al. | |
| 2005/0126681 A1 | 6/2005 | Morgan | |
| 2006/0068176 A1 | 3/2006 | Zafiroglu et al. | |
| 2006/0175877 A1 | 8/2006 | Alionte et al. | |
| 2006/0182935 A1 | 8/2006 | Tompson et al. | |
| 2006/0208378 A1 | 9/2006 | Khambete et al. | |
| 2006/0208379 A1 | 9/2006 | Khambete et al. | |

FOREIGN PATENT DOCUMENTS

WO    WO 2004/080762     9/2004

OTHER PUBLICATIONS

Undated Sketch.
Sketch dated Jul. 16, 2004.

\* cited by examiner

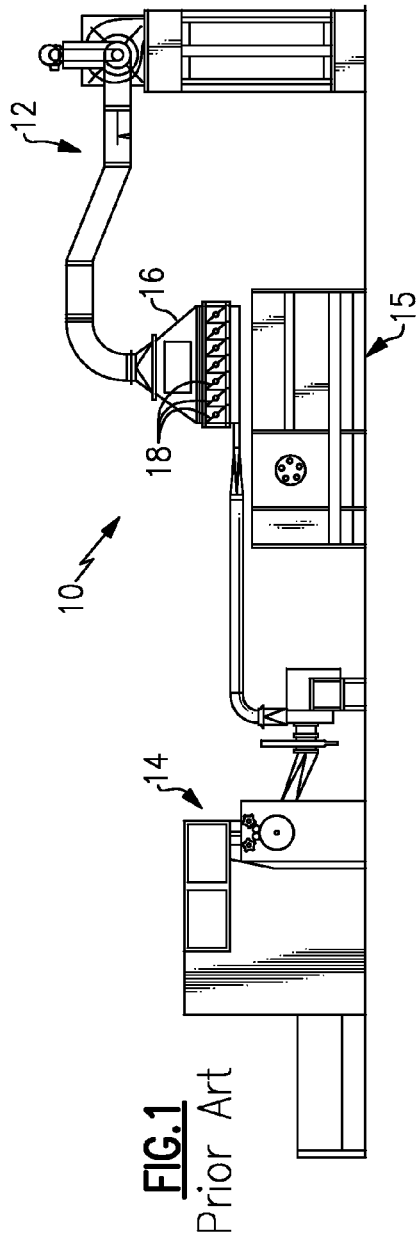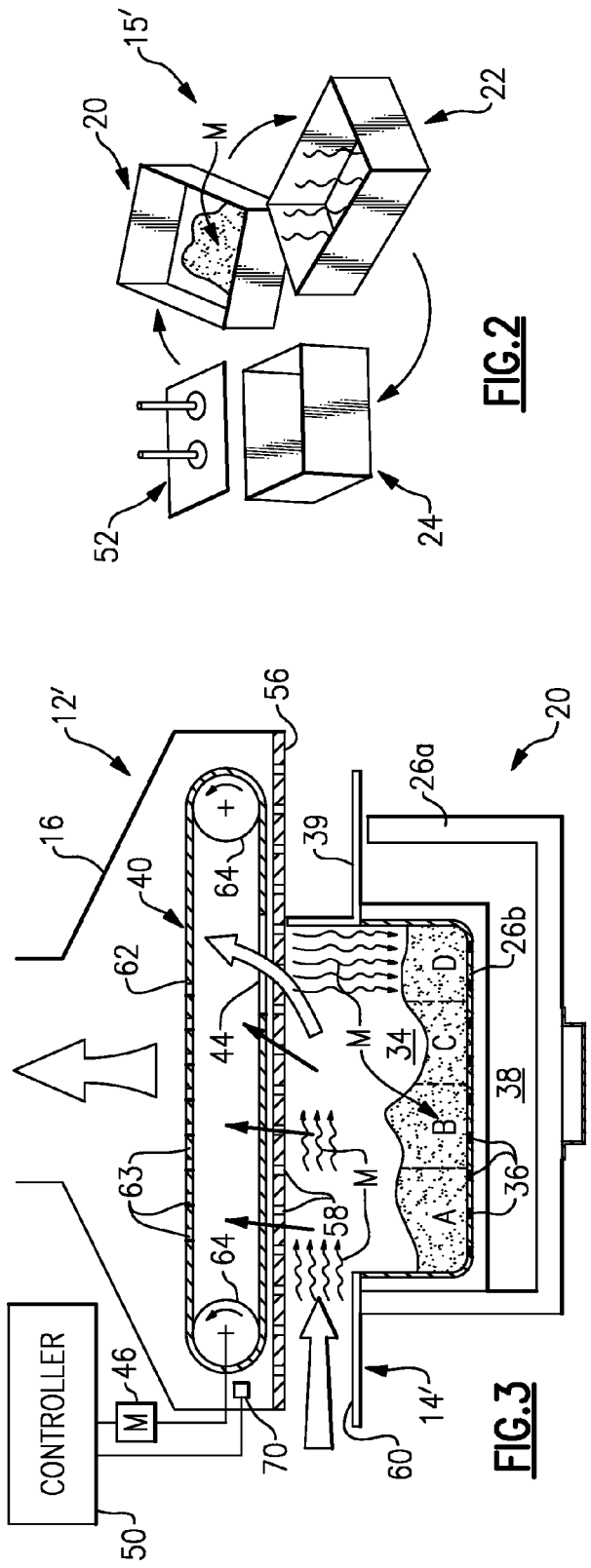

MACHINE HAVING VARIABLE FIBER FILLING SYSTEM FOR FORMING FIBER PARTS

This application claims priority to provisional application No. 60/522,491 filed on Oct. 6, 2004.

BACKGROUND OF THE INVENTION

This invention relates to a machine suitable, for example, for forming polyester cushions.

A schematic view of a prior art machine 10 used in manufacturing molded fiber parts is shown in FIG. 1. The machine 10 includes a vacuum system 12 and fiber feed system 14 that provides fiber material to a mold system 15. In one example process, the fiber feed system 14 blows fiber to a hood 16 of the vacuum system 12. The hood 16 is arranged above the mold system 15. The prior art hood 16 uses multiple flaps 18 to regulate the amount of fiber material deposited within the mold below to vary the volume and density throughout the molded fiber part. The flaps 18 are selectively opened and closed over different portions of the mold to deposit fiber material in columns in varying amounts beneath each flap 18. Each column may have more or less fiber material than another column. The density in each column is based upon the amount in the column, for example, in articles being formed that will have a uniform thickness.

A back pressure indicative of fiber distribution within the mold is monitored by a pressure gauge as the flaps 18 are moved between open and closed positions. Actuation of the flaps 18 is sequential and relatively slow thereby increasing the cycle time. Furthermore, use of the flaps 18 does not result in a very gradual distribution of fibers across the columns within the mold.

More accuracy and flexibility in varying the distribution of fibers within the mold is desired. Moreover, it is desirable to improve the cycle times of the molding process.

SUMMARY OF THE INVENTION

An inventive machine and method are used for manufacturing fiber articles with a variable density across the article. The machine includes a mold providing a cavity. An inventive cover providing an opening is arranged over the cavity. In one example, the opening is provided on a belt. The size of the opening may also be adjustable. The cover and mold move relative to one another to arrange the opening over multiple portions of the cavity. A fiber feed system deposits fiber material in the multiple portions beneath the opening in varying amounts. Various sensors and other devices may be used to control the positioning of the opening to regulate the distribution of fiber deposited in the cavity.

These and other features of the present invention can be best understood from the following specification and drawings, the following of which is a brief description.

BRIEF DESCRIPTION OF THE DRAWINGS

FIG. 1 is a side elevational view of a prior art machine.

FIG. 2 is perspective view of one example inventive mold system.

FIG. 3 is a perspective view of one embodiment of the variable fiber filling system at a first station of the mold system.

DETAILED DESCRIPTION OF THE PREFERRED EMBODIMENT

Figure 4:
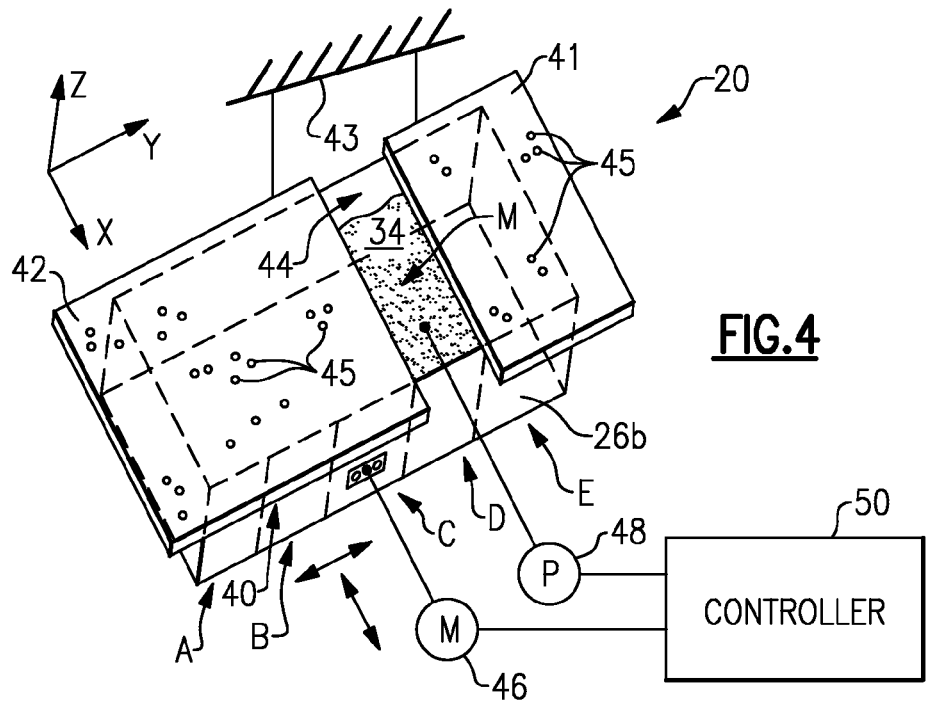
FIG. 4 is a perspective view of another embodiment of the mold system.

Referring FIG. 2, a highly schematic example mold system 15' includes first, second and third stations 20, 22 and 24. The first station 20 provides a filling operation in which fiber material M, such as polyester fibers, is deposited into a mold. The non-woven fibers are deposited in a randomly oriented manner.

The second station 22 provides a heating operation in which the fiber material M is heated to a desired temperature to facilitate bonding between the fibers. The third station 24 is a shaping operation in which the heated fiber material is compressed into a desired part shape by a press 52. The stations 20, 22 and 24 of the mold system 15' can be arranged in a circular manner, as shown, or linearly. In the example system 15', the first and second stations 20 and 22 do not utilize a male member or tool, however, the third station 24 does employ a male member carried by the press 52 to form the fibers into a final desired shape. It should be understood that the invention may be used with other types of molding systems.

In the example shown, the mold system 15' includes a revolving table not shown) that indexes first, second and third female members 26a between the three stations 20, 22 and 24. Operations at the three stations 20, 22 and 24 are performed simultaneously to reduce cycle times. Referring to FIG. 3, the members 26a include molds 26b or tools having cavities 34 that, in part, provide a desired molded part shape, such as a seat cushion. The members 26a and molds 26b are interchangeable with one another since they are indexed between the three stations 20, 22 and 24 to provide the same desired article shape.

Referring to FIG. 3, the molds 26b are spaced from the frame of the members 26a to provide a cavity 38 to enable air to exit the members 26a. The molds 26b include perforations 36 that enable heated and/or cooled air to pass through the fiber material at one or more of the stations 20, 22 and 24. The cavity 38 is closed off during the fiber filling step by plate 39 to prevent airflow through the perforations 36.

Fiber material M, such as polyester fibers, is deposited in the cavity 34 through a passage 60 in the fiber feed system 14'. In the prior art, flaps 18 were manipulated to vary the amount of fiber material M deposited throughout the cavity 34 into columns A-D, for example. It should be understood that other methods of depositing fibers may also be used. Deposit of the fiber material M is highly controlled with the present invention to achieve a desired distribution of material throughout the cavity 34 that results in a desired shaped surface, as described below.

The fiber material M is an all-polyester blend in one example, which provides a completely recyclable end product, unlike polyurethane. The polyester fiber is selected to have desirable acoustic and flammability properties for application in which the end product is used. The variable fiber filling of the present invention better enables the desired acoustic properties to be obtained by accurately depositing fibers in locations needed for desired noise attenuation.

The vacuum system 12' includes a hood 16 and plate 56 having perforations 58, as is known in the art. The plate 56 with its relatively small perforations 58 (in one example, ⅜ of an inch) prevents fiber material M from being drawn into the hood 16. A movable cover 40 is provided by a belt 62 supported by rollers 64. The belt 62 may also include apertures 63, similar to the perforations 58, to permit airflow through the belt 62. The belt 62 has an opening 44 that is positioned over a portion of the cavity 34 to deposit the fiber material M into columns having a desired amount of fiber material M.

The opening 44 is repositioned by driving the belt 62 with a motor 46. A sensor 70 is used to detect the position of the opening 44 in any suitable known manner, such as by detecting the number of revolutions and rotational position of one of the rollers 64. A controller 50 communicates with the motor 46, sensor 70 and any other devices, if desired, to monitor and control the positioning of the opening 44. A pressure sensor can also be used, as discussed relative to FIGS. 4 and 5, or a timing sequence can be used to determine when a desired amount of fiber material M has been deposited into a particular portion of the cavity 34.

The belt 62 can be moved between discrete positions corresponding to the columns, if desired. For example, the belt 62 would be positioned over a portion corresponding to a column and pause until a desired amount of fiber material M has been deposited into the portion. Alternatively, if a more gradual, smoother distribution of fiber material M is desired, the belt 62 is moved in a more continuous fashion over the cavity 34 without pausing over a portion of the cavity 34.

Another embodiment of the invention is shown in FIG. 4. The cover 40 includes perforations 45 arranged over the cavity 34 at the first station 20. The cover 40 includes first and second portions 41 and 42 that are spaced apart from one another to provide an opening 44 over the mold cavity 26*b*. In the example shown in FIG. 4, the first and second portions 41 and 42 are fixed relative to a frame member 43. The mold 26*b* is operatively connected to a numerically controlled stepper motor 46 that is movable in the x and/or y directions beneath the opening 44. As the cavity 34 fills with fiber material M beneath the opening 44, the vacuum increases, which can be measured by a pressure sensor 48.

Once a predetermined pressure has been reached that corresponds to a desired amount of fiber material M with a portion of cavity 34, the opening 34 is advanced to the next position by moving the mold 26*b*. A controller 50 communicates with the stepper motor 46 and pressure sensor 48 to achieve a desired distribution of the fiber material M within the cavity 34 by precisely positioning the mold 26*b* relative to the opening 44.

Figure 5:
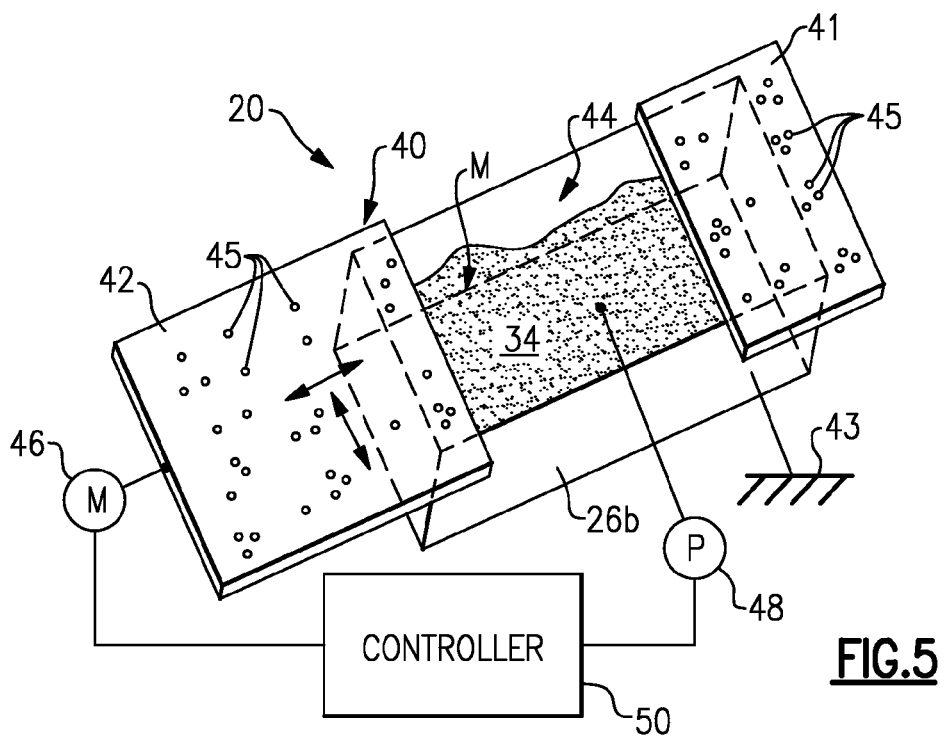
FIG. 5 is a perspective view of yet another embodiment of the mold system.

In another example of the inventive variable fiber filling system, the cover 40 can be moved to relative to a fixed mold 26*b* to vary the size of the opening 44, which will also affect deposit of fiber material M. Referring to FIG. 5, a cavity 34 and first portion 41 of the cover 40 is fixed relative to a frame member 43. The stepper motor 46 is operatively connected to the second portion 42 to increase or decrease the size of the opening 44 above the cavity 34. As a result, the back pressure associated with the mold 26*b* is varied to affect the amount of fiber material M deposited within the cavity 34.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of depositing fiber material into a mold cavity comprising the steps of:
    a) rotating a belt with an opening relative to a mold cavity to position the opening near a first portion of the mold cavity;
    b) blowing a first amount of fiber material through a passage into the first portion, wherein the fiber material is deposited beneath the opening;
    c) rotating the belt to arrange the opening near a second portion of the mold cavity, the second portion in a different location than the first portion; and
    d) blowing a second amount of fiber material through the passage into the second portion, wherein the fiber material is deposited beneath the opening.

2. The method according to claim 1, comprising the step of sensing a pressure in the mold cavity and performing step c) in response to detecting a predetermined pressure.

3. The method according to claim 1, comprising the step of determining an elapsed time associated with performing step b), and performing step c) in response to reaching the elapsed time.

4. The method according to claim 1, wherein the opening pauses over the first portion while performing step b) prior to performing step c).

5. The method according to claim 1, wherein the second amount is different than the first amount.

6. The method according to claim 1, wherein steps a)-d) are performed without the opening pausing over the first and second portions.

7. The method according to claim 1, comprising the step of applying a vacuum to the mold cavity, and varying the vacuum between steps b) and d).

8. The method according to claim 1, wherein the belt includes first and second belt surfaces spaced apart by rollers, the first belt surface including the opening and the second belt surface including apertures configured to permit airflow through the belt.

9. The method according to claim 8, wherein the apertures are smaller than the opening.

10. The method according to claim 1, comprising a plate with perforations arranged between the belt and mold cavity adjacent to the opening, the perforations sized to permit airflow through the plate and prevent the fiber material from being drawn through the perforations.

11. The method according to claim 10, wherein the perforations are smaller than the opening.

12. A method according to claim 1, comprising a motor configured to rotationally drive the belt, a position sensor in communication with a controller and configured to detect the position of the opening relative to the mold cavity, the controller configured to rotate the opening with the motor to position the opening over the first and second portions.

13. A method according to claim 1, wherein steps b) and d) comprise drawing an airflow through the belt and into a hood to deposit the fiber material into the first and second portions beneath the opening.

14. A method according to claim 1, wherein a structure is arranged between the opening and the mold cavity and includes perforations sized to permit airflow through the structure and prevent fiber material from being drawn through the perforations, the perforations smaller than the opening.

15. A method of depositing fiber material into a mold cavity comprising the steps of:
    a) providing first and second covers over a mold cavity;
    b) laterally positioning the first cover relative to the second cover to provide a desired size opening over a selected portion of the mold cavity;
    c) blowing a first amount of fiber material through a passage into the selected portion, wherein the fiber material is deposited beneath the opening;
    d) laterally repositioning the first cover to resize the opening over the mold cavity; and
    e) blowing a second amount of fiber material through the passage into the mold cavity, wherein the fiber material is deposited beneath the resized opening.

* * * * *